July 26, 1960 R. D. NEILSON 2,946,134
GAME INSTRUCTION APPARATUS
Filed Oct. 15, 1959
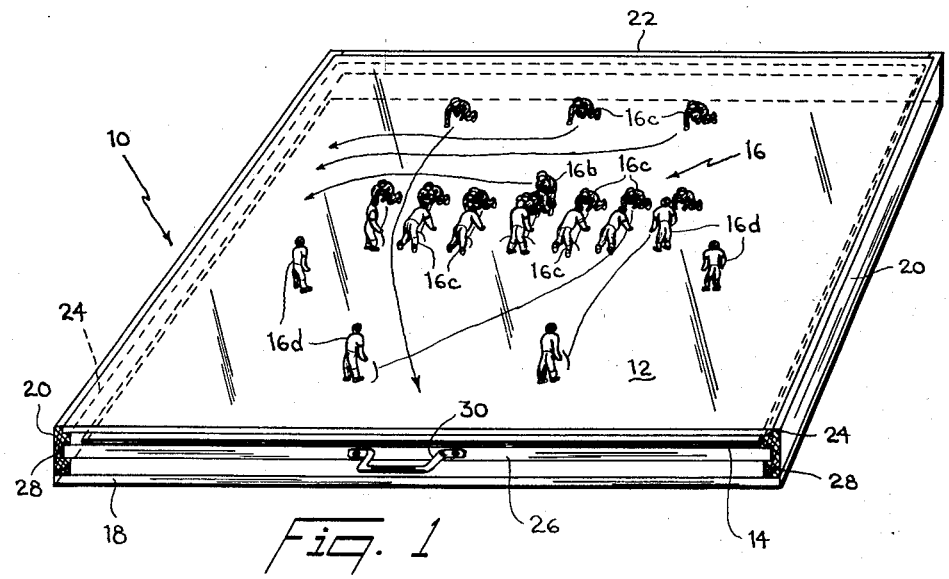
Fig. 3  Fig. 4
Fig. 5  Fig. 6
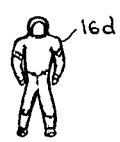 
Fig. 7  Fig. 8
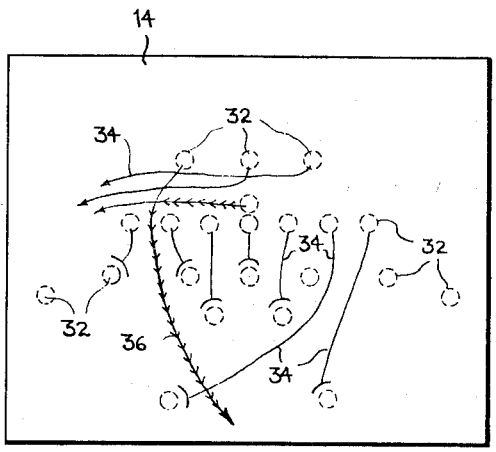
Fig. 2
INVENTOR.
ROGER D. NEILSON
BY Richard von K. Bruns
Atty.

United States Patent Office

2,946,134
Registered July 26, 1960

---

2,946,134

GAME INSTRUCTION APPARATUS

Roger D. Neilson, 39 Bridge St., Pulaski, N.Y.

Filed Oct. 15, 1959, Ser. No. 846,653

7 Claims. (Cl. 35—29)

This invention relates generally to game instruction devices, and has particular reference to novel apparatus for demonstrating and teaching plays used in team type athletic games such as football.

The primary object of the invention is to provide an apparatus for teaching football players their assignments in each play by means of a simple yet graphic display which utilizes small models or figurettes of the players for demonstration purposes. The most conventional way of teaching football plays is by means of blackboard diagrams and paper assignment sheets, but the applicant has found that the players learn the plays more quickly by the three-dimensional apparatus and method to be disclosed. In this connection, it is recognized that various types of magnetic demonstration devices, which use metal supporting sheets and small magnets for the players, have heretofore been substituted for the blackboard diagrams, but these devices are not particularly realistic and usually no means are provided for distinguishing the different players—or even the opposing teams—from one another.

Accordingly, it is another important object of the invention to provide an apparatus of the character described having three-dimensional, substantially life-like models of the players of both teams, which models include means for distinguishing the players of one team from those of the other.

Another important object of the invention is to provide an apparatus of the character described wherein the player models are formed with a number of different stances indicating the different positions filled by the players. This allows the real players who are viewing the apparatus to tell at a glance which models represent them and what their assignment is.

A further important object of the invention is to provide an apparatus of the character described having means whereby once the player models have been arranged in a predetermined manner on the playing area portion of the apparatus, they can be used to demonstrate the individual assignments for a large number of plays without rearrangement.

Still another important object of the invention is to provide an apparatus of the character described which is easy to set up and use.

A still further important object of the invention is to provide an apparatus of the character described which is compact enough to be easily portable, whereby it can be used indoors or outdoors as necessary.

Still another important object of the invention is to provide an apparatus of the character described which is simple in construction and economical to manufacture.

Other objects and advantages of the invention will become apparent from the following detailed description thereof read in conjunction with the accompanying drawings which illustrate a representative embodiment of the invention for the purpose of disclosure.

In the drawings:

Figure 1 is a top perspective view of a play teaching apparatus embodying the invention;

Figure 2 is a top plan view of a representative play sheet;

Figures 3 and 4 are front and side elevations respectively of figurettes representing a football center and quarterback;

Figures 5 and 6 are front and side elevations respectively of a figurette representing a lineman or offensive backfield man; and Figures 7 and 8 are front and side elevations respectively of a figurette representing a defensive end, linebacker or backfield man.

Referring now to the drawings, wherein like reference numbers designate the same element in each of the views, the game instruction apparatus is essentially comprised of a supporting frame 10, a piece of transparent sheet material 12 representing the playing area, a stack of play sheets 14 positioned below the transparent sheet, and a plurality of figurettes fashioned to represent the players of the game and generally indicated at 16. The supporting frame 10 is in the form of a relatively large shallow box which is open at its top and front sides and includes a bottom 18, side walls 20 and back wall 22. As indicated, the sheet material 12 forms a top closure for the box and is supported at its side and back edges by a shoulder 24 formed in the upper edges of the side and back walls 20, 22 whereby the upper surface of the sheet is substantially flush with the top of the frame. The transparent sheet material should be reasonably strong and rigid, and to this end is preferably plate glass or a piece of relatively thick clear plastic.

The play sheets 14, to be described hereinafter, are adapted to be supported on a shelf 26 which is located below the plate glass 12 in such a manner that the top sheet is visible through the glass as indicated in Figure 1. The shelf is slidably mounted in horizontal aligned grooves 28 in the side walls of the supporting frame and is spaced from the glass so that a stack of the play sheets can be accommodated between the shelf and glass. A handle 30 is provided on the front edge of the shelf so that the latter can be pulled out of the frame to facilitate removal and replacement of the play sheets.

In the illustrated embodiment of the invention, the figurettes 16 are three-dimensional models of football players, and a sufficient number of figurettes are provided to make up at least two full teams of eleven men each. The figurettes representing the players of one team are distinguished from those of the other team as by providing the model players with contrastingly colored uniforms. Thus, the players on the offensive team (shown in the background in Figure 1) may be designated by dark colored uniforms, and the players on the defensive team (in the foreground of Figure 1) may be designated by light colored uniforms.

In accordance with the invention, means are also provided for readily identifying the different players on each team, and this is accomplished by forming the figurettes with a number of different stances indicative of the different playing positions filled by the players. Thus, figurettes 16a and 16b are respectively fashioned to represent a center and a T-formation quarterback, as shown in Figures 1, 3 and 4. Similarly, the figurettes 16c are fashioned to represent the defensive guards and tackles and the offensive linemen and backfield men (except for the quarterback), as shown in Figures 1, 5 and 6. Still other figurettes 16d are fashioned to represent the defensive ends and backfield men, as shown in Figures 1, 7 and 8. With this arrangement, the real players viewing the teaching apparatus can easily identify themselves with the figurettes representing their playing positions and can quickly ascertain their particular assignments for a given play.

The play sheets 14 are preferably relatively thin sheets of ordinary drawing paper cut to fit within the confines of the supporting frame 10. These sheets are prepared by the coaching staff to illustrate for the players their ball handling or blocking assignments for each offensive play used by the team. A representative play sheet is shown in Figure 2 wherein the broken line circles 32 indicate the usual positions of the players when lining up for play from scrimmage and the lines 34 are drawn to indicate the assignments of the players of the offensive team (shown in the background on the sheet). Thus, for example, in the play illustrated, the offensive right end is supposed to block out the defensive left end, the offensive right tackle is supposed to block out the defensive left tackle, and so forth. The play is run between the two defensive players mentioned, and the movement of the ball carrier can be indicated by a feathered line 36 or by a line of a contrasting color.

In using the apparatus, a stack of play sheets 14 is positioned on the shelf 26 beneath the glass representing the playing field, and the figurettes are then arranged on the glass so that each player model is located directly over the broken circle 32 representing its position on the play sheet, as indicated in Figure 1. With this arrangement, the lines 34 which indicate the assignments for the players appear to observers looking down on the apparatus to come directly from the models and graphically demonstrate to the real players the over-all plan of the play as well as enabling each individual player to readily identify himself with his model counterpart and determine the assignments he must carry out in order to ensure successful execution of the play.

After the top play sheet has been demonstrated to and discussed with the players, it can be removed from the open front of the supporting frame without disturbing the figurettes and the next play sheet then becomes visible through the glass 12. The play sheets are laid out in such a manner that the locations of the players are exactly the same for each sheet whereby once the figurettes have been properly arranged on the glass relative to the first sheet, they will continue to be in registry with each succeeding sheet. To this end, after one play sheet has been carefully laid out in the manner indicated in Figure 2, the remaining sheets are preferably prepared by laying the completed sheet on the top of a stack of blank sheets and then puncturing the stack by pushing a pointed instrument down through the center of each broken circle 32 so that the holes formed in the blank sheets indicate the proper player position for each sheet. With such an arrangement, the lines 34 can be drawn with reference to the holes or puncture marks in each sheet and the broken circles 32 can, if desired, be omitted altogether since the figurettes will be positioned directly above the holes and the lines will thus appear to originate from the player models as previously described.

From the foregoing description, it will be apparent that the invention provides a relatively simple yet highly graphic demonstration apparatus for teaching plays in athletic games wherein realistic models of the players coact with the remaining structure to enable a quicker and better understanding by observers.

As will be apparent to those familiar with the art, the invention may be embodied in other specific forms without departing from the spirit or essential characteristics thereof. The embodiment disclosed is therefore to be considered in all respects as illustrative rather than restrictive, the scope of the invention being indicated by the appended claims.

What is claimed is:

1. In an instruction apparatus for team type athletic games: a sheet indicating player assignments, a substantially rigid transparent sheet representing the playing area and overlying said player assignment sheet, and a plurality of player simulating figurettes positioned on said playing area sheet in predetermined relation to said player assignment sheet, said player figurettes being formed in a number of different stances to indicate the different playing positions filled by the players.

2. In an apparatus for teaching plays in athletic games: a support member, a play sheet positioned on said support member, a sheet of substantially rigid transparent material mounted on said support member in overlying relation to said play sheet, said transparent sheet representing the playing area and permitting the play sheet to be observed therethrough, and a plurality of figurettes fashioned to represent the players of the game, said player figurettes being formed with several different stances indicating the different positions filled by the players and being positioned on said transparent sheet in predetermined relation to said play sheet.

3. Apparatus as defined in claim 2 wherein said transparent sheet is supported in spaced relation to said play sheet for permitting an additional stack of play sheets to be positioned below the transparent sheet.

4. In an apparatus for demonstrating football plays: a frame having an open top and front side, a piece of sheet glass forming a substantially horizontal top closure for said frame, a shelf mounted in said frame below said sheet glass in spaced parallel relation to the glass, a plurality of play sheets each indicating player assignments, said play sheets being positioned in a stack on said shelf so that the upper sheet is visible through said glass, and a plurality of figurettes fashioned to represent football players and positioned on the upper surface of said sheet glass in a predetermined relation to said play sheets, said player figurettes being formed with the stances normally assumed by the linemen and backfield men of the offensive and defensive teams.

5. Apparatus as defined in claim 4 wherein said shelf is slidable into and out of said frame from the open front side thereof to facilitate the positioning of said play sheets beneath said sheet glass.

6. Apparatus as defined in claim 4 together with means on said play sheets for bringing each sheet into proper registry with the player figurettes positioned on said sheet glass.

7. In an apparatus for demonstrating football plays including a play sheet and a piece of sheet glass overlying said play sheet: a plurality of figurettes fashioned to represent football linemen and backfield men, there being a sufficient number of said figurettes to represent two complete teams of players, and means on said figurettes for distinguishing the players of one team from those of another, said figurettes being adapted to be positioned on said sheet glass in predetermined relation to said play sheet.

References Cited in the file of this patent

UNITED STATES PATENTS

| | | |
|---|---|---|
| 2,158,368 | Hurt | May 16, 1939 |
| 2,263,115 | Winter | Nov. 18, 1941 |
| 2,579,105 | Baldine | Dec. 18, 1951 |
| 2,643,466 | Bucher | June 30, 1953 |